United States Patent [19]

Price, Jr. et al.

[11] Patent Number: 4,971,199
[45] Date of Patent: Nov. 20, 1990

[54] HOLDER FOR TAPE CARTRIDGES

[75] Inventors: Macy J. Price, Jr., Louisville; Laurence G. Ball, Denver, both of Colo.

[73] Assignee: Engineered Data Products, Inc., Broomfield, Colo.

[21] Appl. No.: 438,200

[22] Filed: Nov. 20, 1989

[51] Int. Cl.⁵ .......................................... B65D 85/671
[52] U.S. Cl. .................................. 206/387; 206/560; 211/40; 312/9
[58] Field of Search ............... 206/309, 387, 444, 560; 211/40, 44; 312/9, 10, 12

[56] References Cited

U.S. PATENT DOCUMENTS

| | | | |
|---|---|---|---|
| 3,677,396 | 7/1972 | Staar | 206/387 |
| 3,812,537 | 5/1974 | Grae et al. | 206/387 |
| 3,885,670 | 5/1975 | Cousino | 206/387 |
| 4,203,519 | 5/1980 | Fujitaki | 206/387 |
| 4,406,369 | 9/1983 | Wallace | 206/387 |
| 4,411,481 | 10/1983 | Berkman | 312/10 |
| 4,730,735 | 3/1988 | Lechner | 206/387 |
| 4,779,730 | 10/1988 | Hartsfield et al. | 206/387 |
| 4,844,564 | 7/1989 | Price, Sr. et al. | 312/12 |
| 4,846,355 | 7/1989 | Price, Sr. et al. | 206/387 |
| 4,867,311 | 9/1989 | Metcalf | 206/387 |

Primary Examiner—Jimmy G. Foster
Attorney, Agent, or Firm—Klaas & Law

[57] ABSTRACT

A holder for tape cartridges having a plastic housing divided by a partition to form an upper section and a lower section each of which has a plurality of compartments integrally formed therein so that a tape cartridge may be positioned in each of the compartments and be supported on a bottom support surface and separate resilient force applying structures are secured to the housing and located between an upper surface of the compartment and the upper surface of the tape cartridge to apply a resilient force against the tape cartridge to urge the tape cartridge against the bottom support surface to retain the tape cartridge in the compartment.

19 Claims, 2 Drawing Sheets

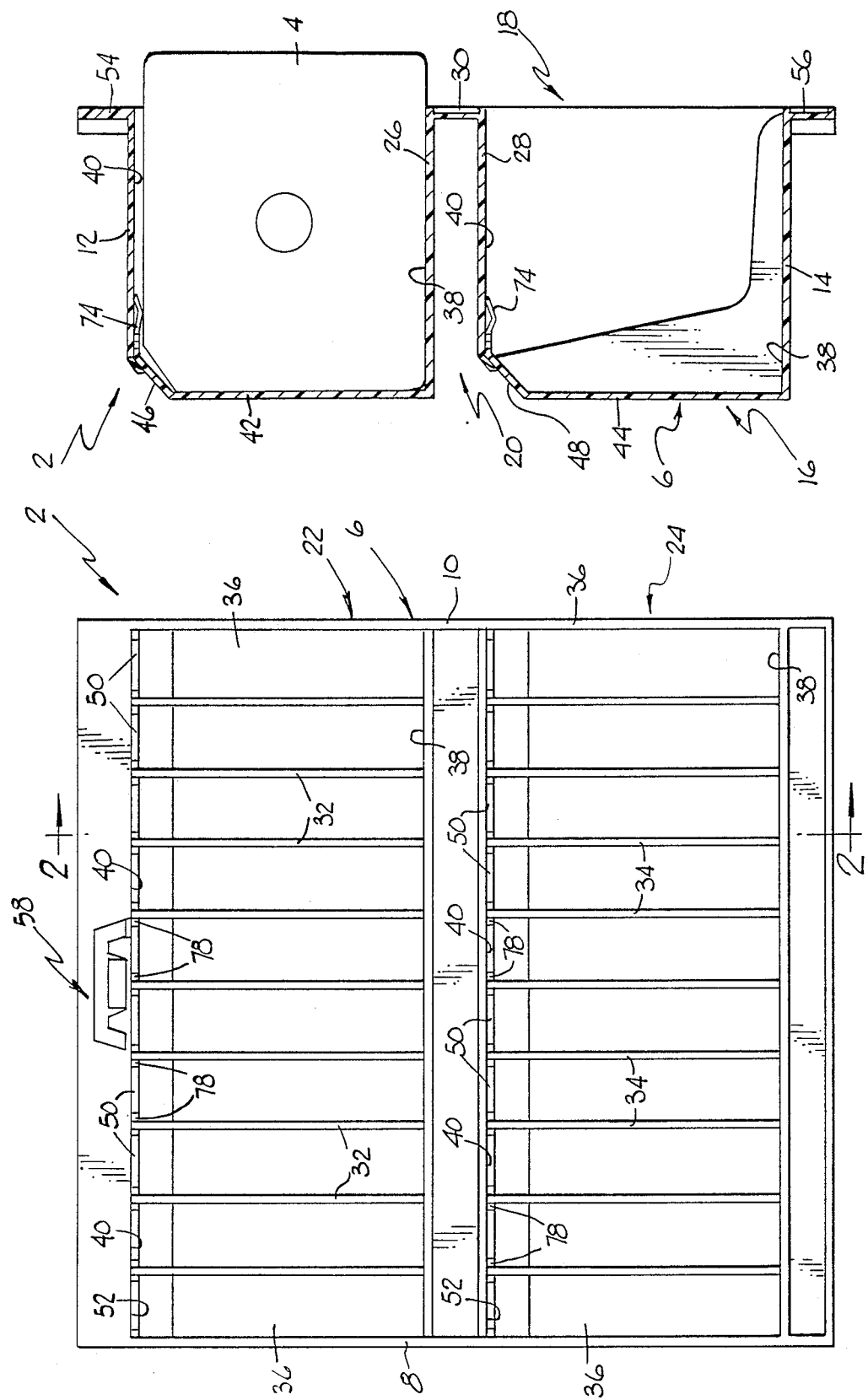

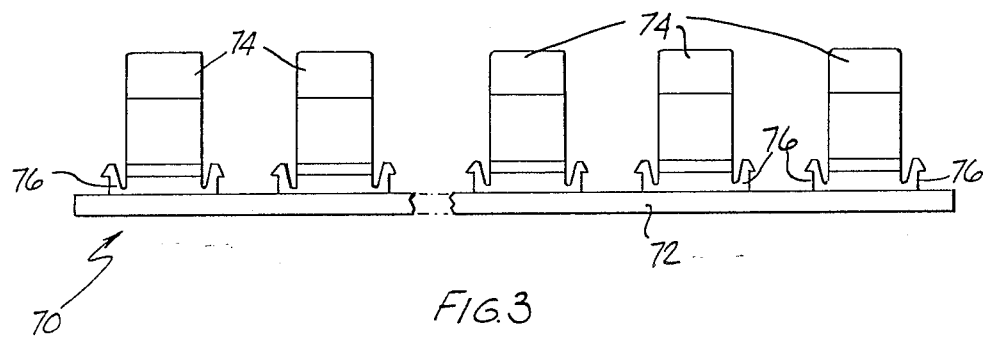
FIG.3
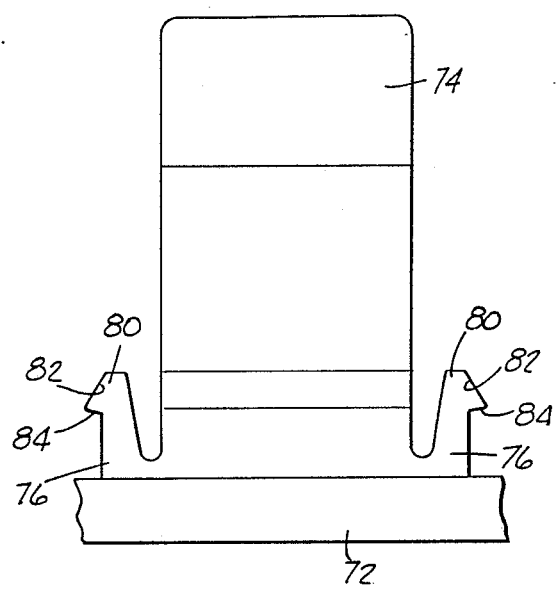
FIG.4
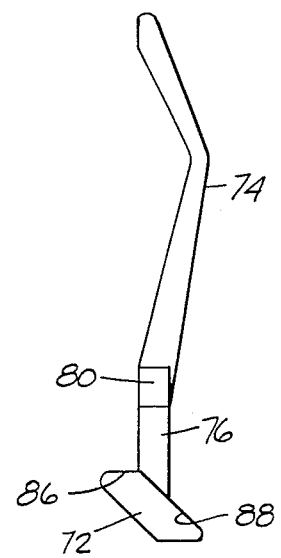
FIG.5
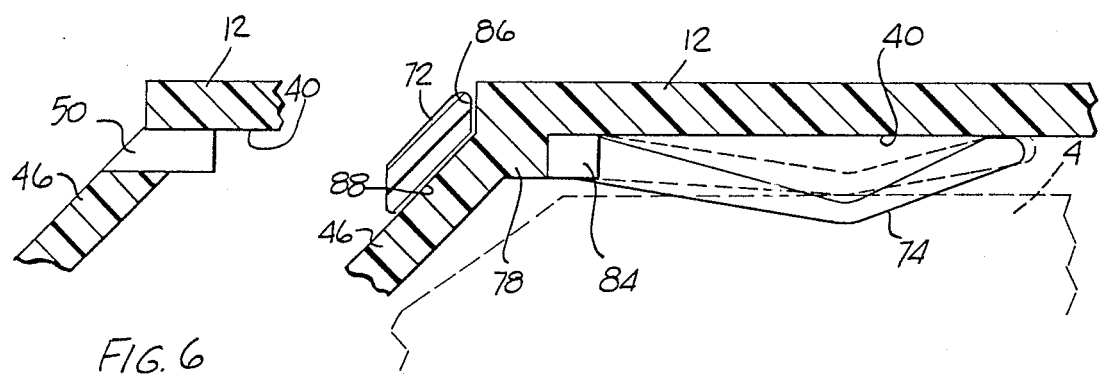
FIG.6
FIG.7

HOLDER FOR TAPE CARTRIDGES

Field of the Invention

The invention relates generally to a holder for tape cartridges that may be used to store or transport tape cartridges and more particularly to a holder for tape cartridges having a plurality of compartments formed therein with each of the compartments holding one tape cartridge and wherein retaining means are provided to retain a tape cartridge in each compartment.

Background of the Invention

There are many types of holders for tape cartridges wherein the holder is provided with compartments each of which is adapted to hold one tape cartridge and wherein resilient means are provided to apply forces to retain the tape cartridge in the compartment. This type of holder is disclosed in U.S. Pat. No. 4,844,564, which is incorporated herein by reference thereto, and in several of the patents of record therein. The holder in the U.S. Pat. No. 4,844,564 utilizes an upwardly extending lip portion to cooperate with resilient means for retaining a tape cartridge in a compartment. While these types of holders function to retain a tape cartridge in a compartment, it is desirable to provide a holder for tape cartridges that retains a tape cartridge in a compartment in a different manner.

Brief Description of the Invention

This invention provides a holder for tape cartridges wherein a housing having an open side in the front portion thereof has a plurality of compartments formed therein, each of which has a generally planar support surface extending into the open side for supporting a tape cartridge and wherein resilient means are provided to urge the tape cartridge in each compartment against the generally planar support surface to retain the tape cartridge in the compartment.

In a preferred embodiment of the invention, the holder for tape cartridges comprises a housing integrally molded using a relatively rigid plastic material and having an open side in the front portion thereof. The housing has a pair of opposite end wall portions, a top wall portion, a bottom wall portion and a back wall portion with partition means extending between and integral with the end wall portions and the back wall portion to divide the housing into an upper section and a lower section. Each of the upper and lower sections have generally planar bottom support surfaces terminating at the open side for supporting tape cartridges and opposite upper surfaces. Compartment forming means are in each of the upper and lower sections for forming a plurality of compartments and each compartment is dimensioned to receive one tape cartridge therein. Separate force applying means are secured to the back wall portions of the upper and lower sections and extend into each of the compartments to apply a resilient force on one side of a tape cartridge in the compartment to urge the opposite side of the tape cartridge into contact with the support surface of the upper or lower section so as to retain the tape cartridge in the compartment. The separate force applying means comprises an elongated base member extending in a longitudinal direction and having a longitudinal axis. A plurality of resilient tabs are integral with the elongated base member and extend outwardly therefrom in a direction generally perpendicular to the elongated base member. A plurality of resilient retaining means are integral with the elongated base member and extend outwardly therefrom in a direction generally perpendicular thereto and are located so that each of the resilient tabs is located between a pair of the retaining means. The back wall portion has a plurality of openings formed therein with each of the openings having at least one edge thereof defined by the upper surfaces of the upper and lower sections and located so that each opening is aligned with one of the compartments. Spaced apart abutment blocks integral with the back wall portion are located in each of the compartments on opposite sides of each opening to cooperate with the retaining means to secure the separate force applying means on the back wall portion. Each of the retaining means has a terminal end portion with each of the terminal end portions having a tapered surface portion adapted to contact an edge of an opening next adjacent to one of the abutment blocks so that, as the retaining means are moved inwardly through the opening, the retaining means are moved inwardly toward the resilient tab portion. Each of the terminal portions has a hook portion for contacting one of the abutment blocks to secure the separate force applying means on said back wall. The hook portions have tapered surfaces so as to apply a resilient force on the elongated base member to pull it into contact with portions of the back wall portion, the top wall portion and the partition means to hold the resilient tabs in contact with the upper surfaces of each of the compartments.

Brief Description of the Drawings

An illustrative and presently preferred embodiment of the invention is shown in the accompanying drawings in which:

FIG. 1 is a front elevational view of the holder;

FIG. 2 is a cross-sectional view taken on the line 2—2 of FIG. 1;

FIG. 3 is a top plan view of the separate resilient force applying means;

FIG. 4 is an enlarged view of a portion of FIG. 3;

FIG. 5 is a side elevational view of FIG. 4;

FIG. 6 is an enlarged cross-sectional view of a portion of the holder; and

FIG. 7 is a cross-sectional view illustrating the separate resilient force applying means in place in a compartment.

Detailed Description of the Invention

In FIGS. 1 and 2, there is illustrated a preferred embodiment of the invention which comprises a holder 2 for tape cartridges 4 wherein the holder 2 comprises a housing 6 integrally molded from a relatively rigid plastic material such as high impact polystyrene or other materials having similar characteristics. The housing 6 has opposite end wall portions 8 and 10, a top wall portion 12, a bottom wall portion 14, a back wall portion 16 and an open front side 18. Partition means 20 extend between and are integral with the end wall portions 8 and 10 and are also integral with the back wall portion 16 and divide the housing 2 into an upper section 22 and a lower section 24. The partition means 20 comprise spaced apart panels 26 and 28 connected by an integral panel 30. Compartment forming means comprising partitions 32 in the upper section 22 and partitions 34 in the lower surface 24 cooperate to form a plurality of compartments 36 each of which is dimensioned to receive only one tape cartridge 4. The partitions 32 are integral with the panel 26 and the back wall portion 16 and the partitions 34 are integral with the bottom wall portion 14 and the back wall portion 16. Each compartment 36 has a generally planar surface 38 for supporting a tape cartridge 4 and which terminates at the open front side 18. Each compartment 34 has a generally planar upper surface 40. The back wall portion 16 comprises two spaced apart sections 42 and 44 and a first inclined section 46 extending between and integral with the back wall section 42 and the top wall portion 12 and a second inclined section 48 extending between and integral with the back wall section 44 and the panel 28. A plurality of openings 50 are formed in the first and second inclined sections 46 and 48 for purposes described below. Each opening 50 has one edge portion 52 defined by the upper surface 40. The housing 2 has an upper flange portion 54, a lower flange portion 56 and locking means 58. Each of the openings 50 is aligned with one of the compartments 36.

Separate resilient force applying means 70, FIG. 3, are provided for applying a force on each tape cartridge 4 in a compartment 36, described more fully below. The separate resilient force applying means 70 are integrally molded from a plastic material that is more rigid than the high impact polystyrene of the housing 2 and has a relatively high fatigue resistance such as crystalline thermoplastic homopolymers made by the polymerization of formaldehyde as marketed by DuPont under the designation Debrin 500 or other materials having similar characteristics.

The separate resilient force applying means 70 comprises an elongated base member 72 extending in a longitudinal direction and having a longitudinal axis. A plurality of resilient tabs 74 are integral with the elongated base member 72 and extend outwardly therefrom in a direction generally perpendicular thereto. A plurality of resilient retaining means 76 are integral with the elongated base member 72 and extend outwardly therefrom in a direction generally perpendicular thereto and corresponding to the direction of the resilient tabs 74. The resilient retaining means 76 are located so that each resilient tab 74 is located between pairs of the resilient retaining means 76.

Spaced apart abutment blocks 78, FIGS. 1 and 7, are located on opposite sides of each opening 50. The abutment blocks 78 in the upper section 22 are integral with the first inclined section 46 and the top wall portion 12 and the abutment blocks 78 in the lower section 24 are integral with the second inclined section 48 and the panel 28. Each of the retaining means 76 has a terminal end portion 80 having a tapered surface portion 82 so that, as the retaining means 76 are pushed through an opening 50, the terminal end portions 80 will be moved inwardly toward the resilient tab 74. The terminal end portion 80 also has a hook portion 84 having an inclined surface so that, when the hook portion 84 has passed the abutment blocks 78, the terminal end portion 80 will resile outwardly and move into contact with an abutment block 78. The elongated base member 72 has a first outer surface portion 86 and a second outer surface portion 88. The resilient retaining means 76 therefore exert a resilient force on the elongated base member 72 so that the first outer surface 86 is pulled into contact with the end surface of either the top wall portion 12 or the panel 28 and the second outer surface portion 88 is pulled into contact with portions of the first or second inclined sections 46 and 48. When the separate resilient force applying means 70 have been secured, the resilient tab 74 will extend into each compartment 36 and be in contact with a portion of the upper surface 40.

The operation of the holder 2 is illustrated in FIG. 7. The resilient tab 74 is normally in the position indicated by the solid outline. When a tape cartridge 4 is inserted, the resilient tab 74 will be moved to the position indicated by the dashed outline and in such position will apply a force on the tape cartridge urging it into contact with the planar support surface 38 to retain the tape cartridge 4 in the compartment 36.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A holder for tape cartridges comprising:

a housing integrally molded using a relatively rigid plastic material and having an open side in the front portion thereof;

said housing having a pair of opposite end wall portions, a top wall portion and a bottom wall portion;

said bottom wall portion having a support surface on which tape cartridges may be supported and an opposite upper surface;

a back wall portion integral with said opposite end wall portions, said top wall portion and said bottom wall portion;

compartment forming means in said housing for forming a plurality of compartments, each of said compartments having dimensions to receive one tape cartridge therein;

said support surface extending into said open side;

separate resilient force applying means secured to said back wall portion and extending into each of said compartments for applying a resilient force on one side of said tape cartridge in each of said compartments to urge the opposite side of said tape cartridge into contact with said support surface to retain said tape cartridge in said compartment; and wherein said separate resilient force applying means comprises:

said back wall portion having a plurality of openings formed therein;

a plurality of resilient tabs each having a portion thereof located in one of said compartments;

an elongated base member adapted to be secured to said back wall portion; and said resilient tabs being integral with said elongated base member and passing through said openings into said compartments to provide said resilient force applying means in each compartment.

2. The invention as in claim 1 and further comprising:

retaining means on each of said resilient tabs for contacting portions of said back wall portion to secure said elongated base member on said backwall portion.

3. The invention as in claim 2 and further comprising:

spaced apart abutment blocks located in each of said compartments on opposite sides of each of said openings.

4. The invention as in claim 3 wherein said retaining means comprise:

a resilient hook portion on each side of said central body portion;

each of said resilient hook portions having a tapered surface for contacting a portion of one of said openings to urge said hook portions toward said central body portion so that each of said resilient tabs can move through one of said openings; and an abutment surface on each of said hook portions for contacting one of said abutment blocks.

5. The invention as in claim 4 wherein:

said resilient force applying means being formed from a plastic material more rigid than said relatively rigid plastic material of said housing.

6. A holder for tape cartridges comprising:

a housing integrally molded using a relatively rigid plastic material and having an open side in the front portion thereof;

said housing having a pair of opposite end wall portions, a top wall portion and a bottom wall portion;

partition means extending between and integral with said pair of opposite end wall portions and dividing said housing into an upper section and a lower section;

each of said upper and lower sections having a support surface on which tape cartridges may be supported and an opposite upper surface;

a back wall portion integral with said opposite end wall portions, said top wall portion, said bottom wall portion and said partition means;

compartment forming partitions in each of said upper and lower sections for forming a plurality of compartments, each of said compartments having dimensions adapted to receive one tape cartridge therein;

first resilient force applying means having a portion thereof located between a tape cartridge in one of said compartments and a portion of said upper surface of said upper section to urge said tape cartridge against said support surface of said upper section to retain said tape cartridge in said compartment;

second resilient force applying means having a portion thereof located between a tape cartridge in one of said compartments and a portion of said upper surface of said lower section to urge said tape cartridge against said support surface of said lower section to retain said tape cartridge in said compartment;

securing means for securing each of said first and second force applying means on said back wall portion; and wherein said first and second resilient force applying means each comprise:

said back wall portion having a plurality of openings formed therein;

a plurality of resilient tabs each having a portion thereof located in one of said compartments;

an elongated base member adapted to be secured to said back wall portion; and said resilient tabs being integral with said elongated base member and passing through said openings into said compartments to provide said resilient force applying means in each compartment.

7. The invention as in claim 6 wherein said partition means comprises:

an upper member providing said support surface for said tape cartridges in said compartments of said upper section; and a lower member for providing said upper surface for said compartments of said lower section.

8. The invention as in claim 7 wherein:

each of said openings having at least one edge thereof defined by said upper surfaces of said upper and lower sections.

9. The invention as in claim 8 and further comprising:

spaced apart abutment blocks located in each of said compartments on opposite sides of each of said openings;

each of said resilient tabs having a central body portion for providing said resiliency; and retaining mans on each of said resilient tabs for contacting said abutment blocks to retain said first and second elongated base members on said back wall portion.

10. The invention as in claim 9 wherein said retaining means comprises:

a resilient hook portion on each side of said central body portion;

each of said resilient hook portions having a tapered surface for contacting a portion of one of said openings to urge said hook portions toward said central body portion so that each of said resilient tabs can move through one of said openings; and an abutment surface on each of said hook portions for contacting one of said abutment blocks.

11. The invention as in claim 9 and further comprising:

said first elongated base member having a first surface portion facing a portion of said back wall portion and a second surface portion facing a portion of said top wall portion;

said second elongated base member having a first surface portion facing a portion of said back wall portion and a second surface portion facing a portion of said lower member; and said hook portions exerting a resilient force on said first and second elongated base members to ensure contact between said first surface portions and said portions of said back wall portion and between said second surface portions and said portions of said top wall portion and said lower member to retain said resilient tab portion at a desired location when a tape cartridge is inserted into a compartment.

12. The invention as inn claim 11 wherein:

said resilient force applying means being formed from a plastic material more rigid than said relatively rigid plastic material of said housing.

13. The invention on as in claim 12 wherein said back wall portion comprises:

two spaced apart sections extending generally perpendicular to said top wall portion, said partition means and said bottom wall portion;

a first inclined section extending between one of said two spaced apart sections and said top wall portion and a second inclined section extending between the other of said two spaced apart sections and said lower member; and said openings being located in said first and second inclined sections.

14. A holder for tape cartridges comprising:

a housing integrally molded using a relatively rigid plastic material and having an open side in the front portion thereof;

said housing having a pair of opposite end wall portions, a top wall portion and a bottom wall portion;

said bottom wall portion having a generally support surface on which tape cartridges may be supported and an opposite upper surface;

a back wall portion integral with said opposite end wall portions, said top wall portion and said bottom wall portion;

compartment forming means in said housing for forming a plurality of compartments, each of said compartments having dimensions to receive one tape cartridge therein;

said generally support surfaces extending into said open side;

separate resilient force applying means secured to said back wall portion and extending into each of said compartments for applying a resilient force on one side of said tape cartridge in each of said compartments to urge the opposite side of said tape cartridge into contact with said support surface to retain said tape cartridge in said compartment; and wherein said separate resilient force applying means comprises:

said back wall portion having a plurality of openings formed therein;

an elongated base member extending in a longitudinal direction and having a longitudinal axis;

a plurality of resilient tabs integral with said elongated base member and extending outwardly therefrom in a direction generally perpendicular to said elongated base member; and a plurality of resilient retaining means integral with said elongated base member and extending outwardly therefrom in a direction generally perpendicular to said elongated base member so that each of said resilient tabs is located between a pair of said retaining means.

15. The invention as in claim 14 and further comprising:

each of said openings having at least one edge thereof defined by said upper surface and located so that each opening is aligned with one of said compartments; and spaced apart abutment blocks integral with said back wall portion located in each of said compartments on opposite sides of each of said opening to cooperate with said retaining means to secure said separate force applying means on said back wall portion.

16. The invention as in claim 15 wherein:

each of said retaining means having a terminal end portion;

each of said terminal end portions having a tapered surface portion adapted to contact an edge of said opening next adjacent to one of said abutment blocks so that, as said retaining means are moved through said opening, said retaining means are moved inwardly toward said resilient tab portion; and each of said terminal portions having a hook portion for contacting one of said abutment blocks to secure said separate force applying means on said back wall.

17. The invention as in claim 16 wherein said back wall portion comprises:

a section extending generally perpendicular to said top wall portion and said bottom wall portion;

an inclined section extending between said section and said top wall portion; and said openings being located in said inclined section.

18. The invention as in claim 17 and further comprising:

said elongated base member secured to said inclined section having a first surface portion facing a portion of said inclined section and a second surface portion facing a portion of said top wall portion; and said hook portions exerting a resilient force on said elongated base member to ensure contact between said first surface portions and said facing portions of said inclined section and between said second surface portion and said facing portion of said top wall portion.

19. The invention as in claim 18 wherein:

said resilient force applying means is formed form a plastic material more rigid than said relatively rigid plastic material of said housing.

* * * * *